US011015899B2

(12) United States Patent
Romano (10) Patent No.: US 11,015,899 B2
(45) Date of Patent: *May 25, 2021

(54) FIREARM HOLSTER

(71) Applicant: Vincent William Romano, Skokie, IL (US)

(72) Inventor: Vincent William Romano, Skokie, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,177

(22) Filed: Aug. 9, 2019

(65) Prior Publication Data

US 2020/0003522 A1    Jan. 2, 2020

Related U.S. Application Data

(63) Continuation of application No. 15/484,579, filed on Apr. 11, 2017, now Pat. No. 10,393,478.

(60) Provisional application No. 62/390,787, filed on Apr. 11, 2016.

(51) Int. Cl.
| | |
|---|---|
| *F41C 33/02* | (2006.01) |
| *F41H 5/04* | (2006.01) |
| *F41C 33/04* | (2006.01) |
| *B29C 70/46* | (2006.01) |
| *B29C 65/60* | (2006.01) |
| *B29C 65/70* | (2006.01) |
| *A45F 5/02* | (2006.01) |
| *B29C 53/40* | (2006.01) |
| *B29K 23/00* | (2006.01) |
| *B29K 105/06* | (2006.01) |
| *B29K 105/00* | (2006.01) |
| *B29L 31/00* | (2006.01) |

(52) U.S. Cl.
CPC .......... *F41C 33/0236* (2013.01); *A45F 5/021* (2013.01); *B29C 53/40* (2013.01); *B29C 65/601* (2013.01); *B29C 65/70* (2013.01); *B29C 70/46* (2013.01); *F41C 33/02* (2013.01); *F41C 33/041* (2013.01); *F41H 5/0471* (2013.01); *A45F 2200/0591* (2013.01); *B29K 2023/0683* (2013.01); *B29K 2105/06* (2013.01); *B29K 2105/256* (2013.01); *B29L 2031/777* (2013.01)

(58) Field of Classification Search
CPC .............. Y10S 224/911; Y10S 224/912; F41C 33/0209; F41C 33/0227; F41C 33/041; F41C 33/06; F41C 33/02; A45F 2200/0591; A45C 13/008
See application file for complete search history.

(56) References Cited

U.S. PATENT DOCUMENTS

| | | | | |
|---|---|---|---|---|
| 1,547,800 | A * | 7/1925 | Franz | F41C 33/0209 224/243 |
| 1,853,013 | A * | 4/1932 | Brady | B65D 29/00 383/78 |
| 4,787,540 | A * | 11/1988 | Barry | F41C 33/0236 224/192 |
| 6,085,952 | A * | 7/2000 | Garland | A45F 5/021 224/242 |

(Continued)

*Primary Examiner* — Adam J Waggenspack
(74) *Attorney, Agent, or Firm* — McCracken & Gillen LLC (57) ABSTRACT

A firearm holster includes a first half shell and a second half shell. The first half shell is nested in the second half shell to form a cavity therebetween for enclosing one or both of a barrel and a trigger area of a firearm. The cavity further includes an opening for receiving the firearm and otherwise having no other gaps or openings.

20 Claims, 11 Drawing Sheets

(56) References Cited

U.S. PATENT DOCUMENTS

| | | | | |
|---|---|---|---|---|
| 7,258,259 B1* | 8/2007 | Owens | ............. | A45F 5/02 |
| | | | | 224/192 |
| 9,913,518 B2* | 3/2018 | Su | ............. | A45F 3/04 |
| 2015/0353232 A1* | 12/2015 | Kandel | ............. | A47G 23/06 |
| | | | | 220/574 |
| 2018/0354223 A1* | 12/2018 | Huang | ............. | B32B 5/024 |

* cited by examiner

FIREARM HOLSTER

CROSS-REFERENCE TO RELATED APPLICATIONS

This patent application is a continuation of U.S. patent application Ser. No. 15/484,579, filed on Apr. 11, 2017, entitled "Firearm Holster of Ballistic Material," which in turn claims the benefit of U.S. Provisional Patent Application Ser. No. 62/390,787, filed on Apr. 11, 2016, entitled Firearm Holster of Solid Ballistic Material that Retains Bullets from Unintentional Discharges. The entire contents of these applications are incorporated herein by reference.

BACKGROUND

The invention relates generally to firearm holsters and more specifically it relates to a firearm holster of solid (i.e. without breaks or gaps) ballistic material that retains or deflects bullets when a firearm is discharged into the holster.

Currently, firearm users who carry a firearm on their person in a concealed or non-concealed manner have a number of choices for holstering and carrying their weapon. These options can be made of hard or soft materials. The holster can be designed to be worn outside or inside of the pants. The holster can also be attached to many locations on a user's body using a carrying device, including, for example, a belt, waistband, a vest, chest rig, ankle holster or a shoulder harness. In addition, holsters are often attached to surfaces in locations other than on a user's body, such as in a vehicle or on furniture like a desk, shelf, bed, counter or table using a mount or other carrying device.

In the course of inserting or withdrawing the firearm from the holster, it is possible to unintentionally actuate the firearm trigger either by the user or by a foreign object. This actuation of the trigger creates an unintentional discharge of the weapon. In addition, there are situations where someone other than the user may attempt to discharge the firearm through the holster during a struggle. Since the holster is attached to the user's body, this event may cause injury or death to the firearm user or create collateral damage to other people or objects. To minimize this type of occurrence, many firearms are designed with safety mechanisms that prohibit the weapon from being discharged, even if the trigger is pulled. However, the use of a safety mechanism may impair the user's ability to operate the firearm so the user may choose not to engage the mechanism or disengage it during use. Other firearms in regular use do not even contain such safety mechanisms or have a safety that can be easily actuated by a foreign object. For these reasons and others, firearm discharge inside a holster is a serious problem for users.

One solution to this problem is to purchase a soft firearm holster with a ballistic material insert at the bottom. One problem with this solution is that the ballistic material is limited to the bottom of the holster and is not present in the entire holster. Thus, the discharged bullet will only be stopped if the firearm is pointed directly at the insert at time of unintentional discharge. This may not be effective, however, since most unintentional discharges occur during the insertion or withdrawal of the firearm from the holster during which time the firearm moves through a range of positions relative to the holster and won't always be aimed directly at the bottom of the holster. Another problem with this solution is that soft ballistic material is constructed using seams which do not have the same ballistic properties as the non-seamed surfaces. It is possible for the discharged bullet to penetrate the holster if it is struck in one of these seams. In addition, soft ballistic material is prone to wear over time that can degrade its ballistic properties, it is bulky and unpractical for serious use because it may impede or come out of the holster when the firearm is drawn, particularly during quick fast and multiple draws and re-holstering such as occur when a firearm user is in training.

Thus, a need exists for a firearm holster that incorporates ballistic material, is constructed in a seamless manner, and is constructed of molded ballistic materials to form a solid holster, i.e. without breaks or gaps. There is a further need for a firearm holster that is lightweight and comfortable to carry on a user's body while being sturdy and able to withstand harsh conditions.

SUMMARY

The present disclosure relates to a firearm holster which is constructed of ballistic or a combination of ballistic and non-ballistic material in such a way that a bullet that is discharged into the holster doesn't cause injury or death to the user of the firearm or to other persons or property. In particular, a firearm holster retains the discharged bullet, or deflects the bullet in a way that minimizes injury, death or damage to property.

In an embodiment, the invention encompasses a molded firearm holster including one or more sheets of material molded into a cavity for enclosing at least a barrel and trigger area of a firearm, said cavity further comprising an opening for receiving the firearm and otherwise having no other gaps or openings.

In another embodiment, the invention encompasses a firearm holster having a cavity molded from one or more sheets of material, the cavity including a first sidewall; a trigger sidewall adjacent to said first sidewall; a second sidewall adjacent to said trigger-side sidewall; a barrel sidewall adjacent to both the first and second sidewalls; a muzzle end wall adjacent to the first sidewall, the trigger sidewall, the second sidewall and the barrel sidewall so as to form the molded cavity having no gaps or openings between the muzzle end wall and any of the sidewalls; and one or more support wraps wrapped around the cavity; wherein said cavity retains a bullet when the firearm is discharged inside the holster.

In either of the above embodiments, at least one of said sheets of material further comprise a ballistic material. In further embodiments, the ballistic material is ultra-high-molecular-weight polyethylene (UHMWPE) impregnated with a thermoset composition.

In any of the above embodiments, the one or more sheets further comprises one or more sheets of an aramid material or a carbon fiber material.

In any of the above embodiments, including mounting hardware for attaching the molded firearm holster to a carrying device or further including one or more retention mechanisms for retaining the firearm in the holster.

In another embodiment, the invention encompasses a method of making a molded firearm holster including the steps of selecting the one or more sheets of material, at least one of said sheets of material being a ballistic material; stacking the one or more sheets in a mold; heating and molding the one or more sheets to form first half of the molded firearm holster with a main sidewall and partial sides on three edges of the main sidewall; repeating the selecting, stacking and heating and molding steps to form a second half of the molded firearm holster with a main sidewall and partial sides on three edges of the main sidewall; nesting the first and second halves of the firearm holster to form the cavity so that the partial sides on the three edges of the first and second halves overlap; and heating and molding them together to form the molded firearm holster.

In a further embodiment the method includes a step of using one or more screws or rivets for securing the first and second halves.

In another embodiment, the invention encompasses a method of making a firearm holster including the steps of selecting the one or more sheets of material, at least one of said sheets of material being a ballistic material; cutting the one or more sheets of material to form a pattern so that barrel sidewall is between and attached to the first sidewall and second sidewalls, the muzzle end wall is attached to another edge of the barrel sidewall and the trigger sidewall is attached to the opposite side of the muzzle end wall from the barrel sidewall; heating the one or more sheets of material to form a plate; folding the plate around a form to create the cavity; cutting one or more support wraps to wrap around the cavity; and fusing the one or more support wraps around the cavity to form the firearm holster.

In a further embodiment the method includes a step of using one or more screws or rivets for securing the support wraps, wherein the support wraps further comprise one or more sheets of ballistic material In either of the above methods, the ballistic material is ultra-high-molecular-weight polyethylene (UHMWPE) impregnated with a thermoset composition.

In either of the above methods, wherein the ballistic material further comprises two or more sheets of material, each comprising a plurality of fibers aligned and bonded into a sheet, and an alignment of fibers in a first sheet is at an angle to an alignment of fibers in an adjacent sheet.

DESCRIPTION OF THE DRAWINGS

Features of example implementations of the invention will become apparent from the description, the claims, and the accompanying drawings in which:

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
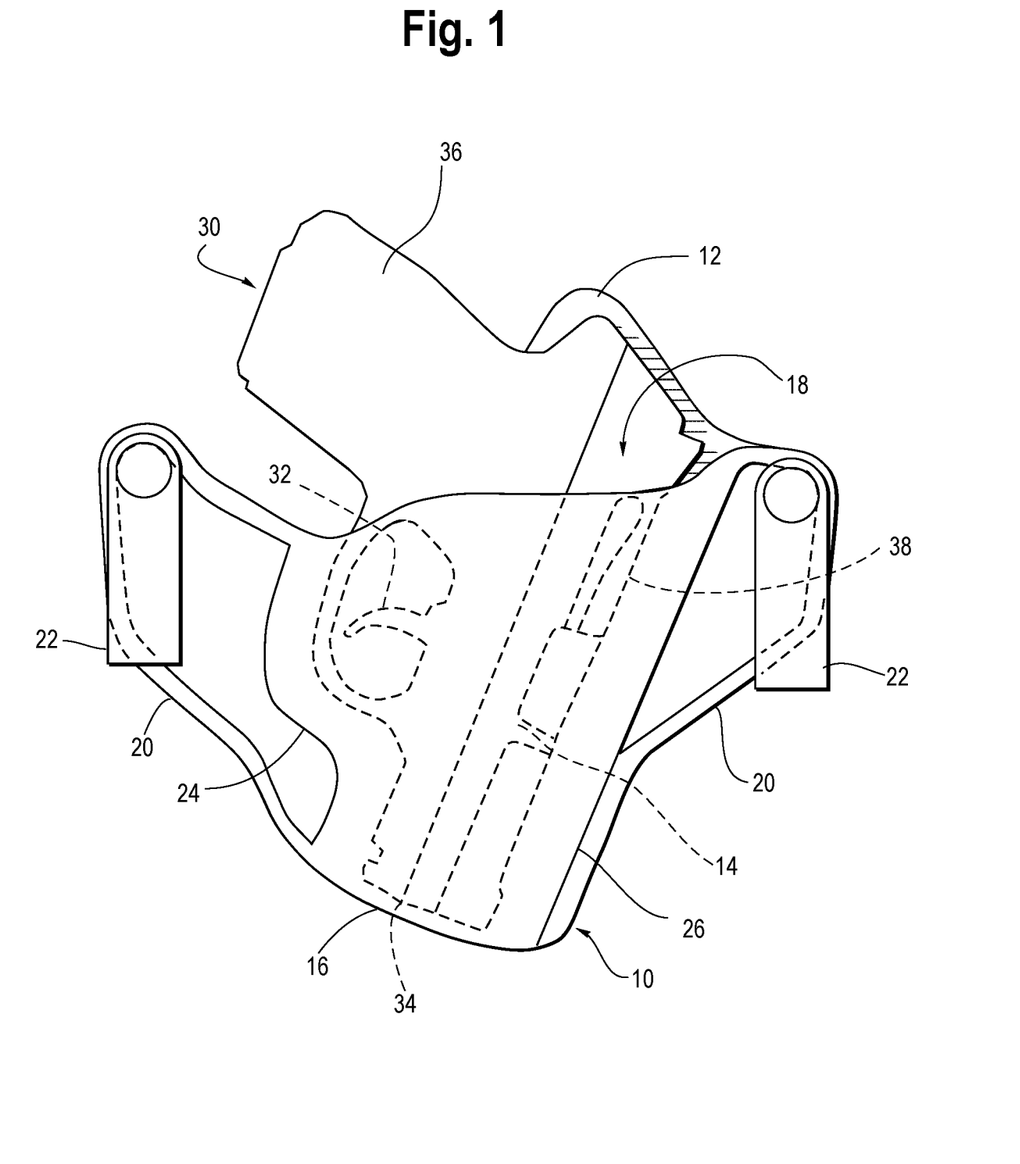
FIG. 1 is a side view of a holster according to the present invention.

A firearm holster 10 according to the present invention is shown in FIG. 1. Firearm 30 is inserted into cavity 18 of holster 10. Holster 10 is constructed of solid ballistic material, i.e. without breaks or gaps, of sufficient strength and durability to capture a bullet fired from the firearm device 30 for which holster 10 is designed. In an embodiment, holster 10 is made from ultra-high-molecular-weight polyethylene (UHMWPE), for example, Dyneema® or Spectra®. Holster 10 could also be made from other ballistic materials such as an aramid fiber, for example, Kevlar®, or from a combination of all of these materials, as will be explained further below. In addition to ballistic materials, a holster according the present invention may also incorporate metal, carbon fiber, fiberglass, plastic, leather, fabric and other materials.

Holster 10 includes a body sidewall 12, an away sidewall 14, a barrel sidewall 26, a trigger sidewall 24 and a muzzle end wall 16 which together form cavity 18. Cavity 18 encloses firearm 30 when it is inserted into cavity 18. Although sidewalls 12 and 14 have been identified as "body side" and "away side," one of ordinary skill in the art would understand that these roles could be reversed depending, for example, on where the holster is located. Firearm 30 includes a trigger 32, muzzle 34, grip 36 and barrel 38 as would be understood by one of ordinary skill in the art. Although a specific firearm is shown, this is merely representative. A holster according to the present invention could be used with any type of handheld firearm, for example, revolvers and pistols. In addition, principles of the invention may be used to fabricate a holster or sheath for a long gun, for example, a rifle or a shotgun.

Body sidewall 12 of holster 10 of FIG. 1 is positioned closest to a user of the holster. Away sidewall 14 is positioned facing away from the user. The muzzle end wall 16 is positioned between the body sidewall 12 and the away sidewall 14. The body side 12, away side 14, barrel side 26, trigger side 24 and muzzle end 16 walls are all fixedly attached to each other as one seamlessly constructed unit to form cavity 18.

Firearm 30 is inserted into the holster 10 such that the muzzle 22 faces muzzle end wall 16 and grip 36 protrudes from cavity 18. Holster 10 is designed so that the firearm trigger 20 is fully contained inside cavity 18 when firearm 30 is fully inserted as shown. Holster 10 also includes flanges 20 which are fixedly or removably attached to holster 10. Flanges 20 hold mounting hardware 22 for securing holster 10 to a carrying device (not shown) such as a belt, waistband, vest, chest rig or harness, for example. As pictured, holster 10 and mounting hardware 22 are oriented for attaching holster 10 at a waist of a user. Other locations may require different orientations and mounting hardware. Also, holster 10 may be secured to many other surfaces, such as in a vehicle or to furniture using the appropriate carrying device.

Although a specific design is shown in FIG. 1, one of ordinary skill in the art would understand that holster 10 could be formed in a variety of ways to accommodate different firearm models or firearms with a variety of accessories such as flashlights, electronic sights, threaded barrels, muzzle devices, etc.

Figure 2:
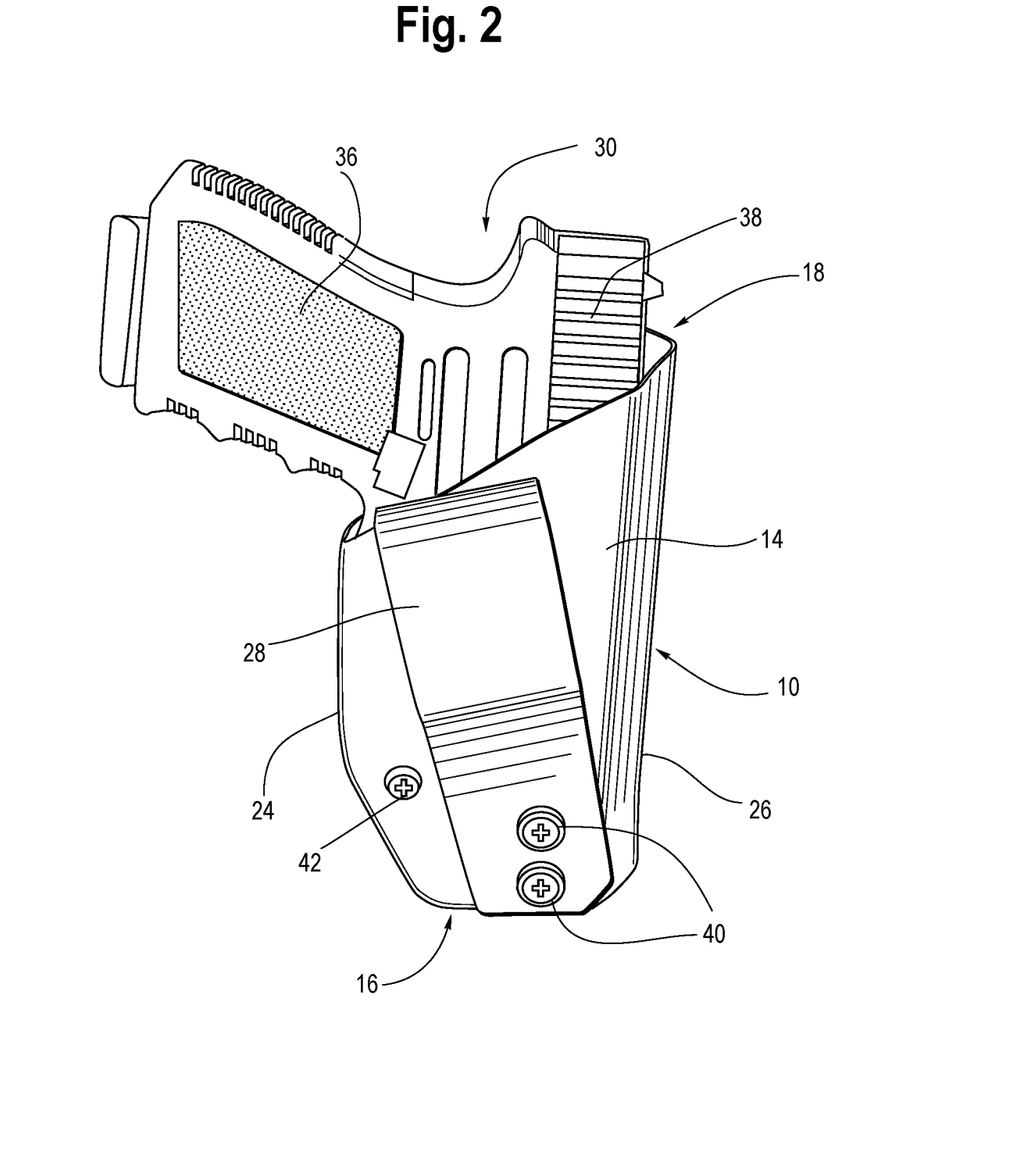
FIG. 2 is another side view of a holster according to the present invention.

Another view of holster 10 of FIG. 1 is shown in FIG. 2. Firearm 30 is inserted into cavity 18 muzzle end first, similarly to FIG. 1 so that grip 36 protrudes from cavity 18. FIG. 2 also shows an alternative mounting hardware 28 attached to sidewall 14. Mounting hardware 28 is attached by means of screws 40, although other mechanisms for attaching mounting hardware 28 to holster 10 could be used. Single or multiple (as in FIG. 1) mounting hardware 28 are fixedly or removably attached to holster 10 on either side so that sidewall 14 may correspond to either the away sidewall or the body sidewall 12 of FIG. 1. In an alternative embodiment of the invention, right and left belt mounting hardware 22 of FIG. 1 are removably attached to the right and left of the body side ballistic wall 12 of FIG. 1. Mounting hardware 28 is designed to interface with a belt or with the waistband of the clothing worn by the user of the invention and is designed to allow the invention to be carried on the external or internal surface of the clothing to which it is attached. In other embodiments of the invention, mounting hardware 28 may be designed to interface with a vest or other device worn by the operator, as well as other surfaces as explained above.

To operate the invention in the embodiment depicted in FIGS. 1 and 2, the firearm user positions holster 10 such that one or more pieces of mounting hardware 28 are removably attached to the belt or waistband of the user. Firearm 30 is fully inserted into holster 10. The user may later choose to remove the firearm 30 from holster 10. If at any time during insertion or withdrawal of firearm 30, the firearm is discharged, the ballistic material of holster 10 captures the bullet and prevents it from leaving the interior of the holster 10.

As explained above, a holster 10 according to the present invention is fabricated from ballistic material such as ultra-high-molecular-weight polyethylene (UHMWPE), for example, Dyneema® or Spectra®. UHMWPE is typically manufactured as fiber. For personal armor applications, such as bullet-proof vests, the fibers are generally aligned and bonded into single ply sheets and pre-impregnated with a matrix such as a thermoset polymer, for example, a resin, epoxy, plastic, rubber or silicon material. These sheets are then layered in varying angles so as to provide similar strength in all directions. The number of plies used determines the degree of bullet resistance. To control performance and appearance characteristics of the inventive holster, some of the sheets used in the bonding process may be made of other material, such as an aramid like Kevlar or other materials such as carbon fiber, fiberglass, or cloth, or a combination of any of these, for example. In an embodiment, one or more sheets of UHMWPE are used, depending on the thickness of each sheet and the caliber of firearm for which the holster is intended.

Figure 11A:
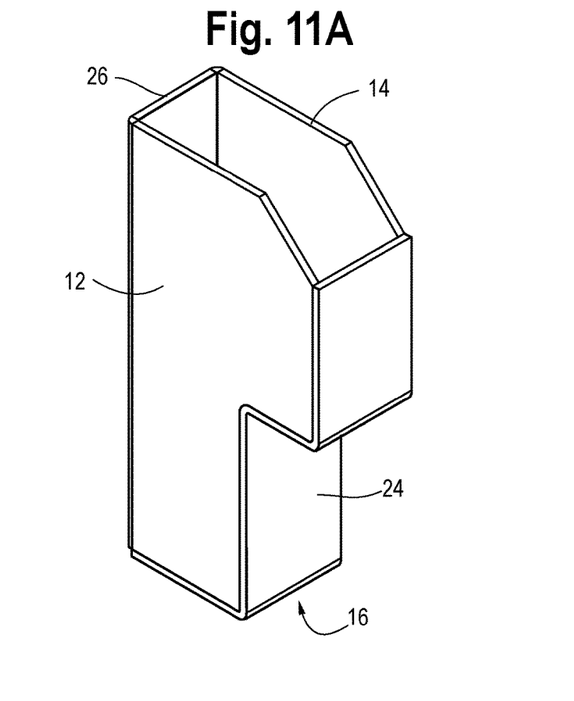
FIGS. 11A-11J are a view illustrating a manufacturing process according to the present invention.

Diagrams illustrating a manufacturing process of the inventive holster is shown in FIGS. 11A-11I. The general shape of a holster including sidewalls 12 and 14, trigger sidewall 24, barrel sidewall 26 and muzzle end wall 16 as in FIGS. 1 and 2 is depicted in FIG. 11A. One of ordinary skill in the art would understand that the inventive holster may be customized to fit the contours and accessories of a particular firearm.

Figure 11B:
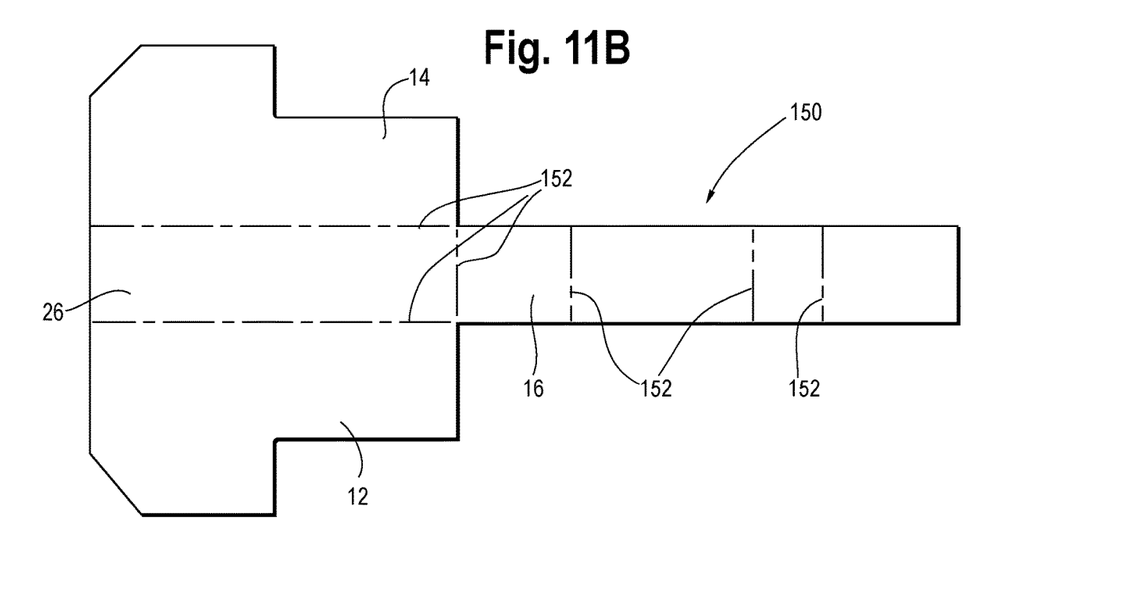

FIG. 11B depicts a first step in the manufacturing process, where a flat pattern 150 is cut from a plurality of sheets of ballistic or a combination of ballistic and non-ballistic material selected as explain above. In an embodiment, 11 sheets of UHMWPE are used. The sheets are heated and fused to form a plate. In a next step, pattern 150 is folded along lines 152 into the holster of FIG. 11A to form the holster of FIG. 11A. A form of aluminum or another metal is used to create the holster shape and during the subsequent fusing steps describe below.

Figure 11C:
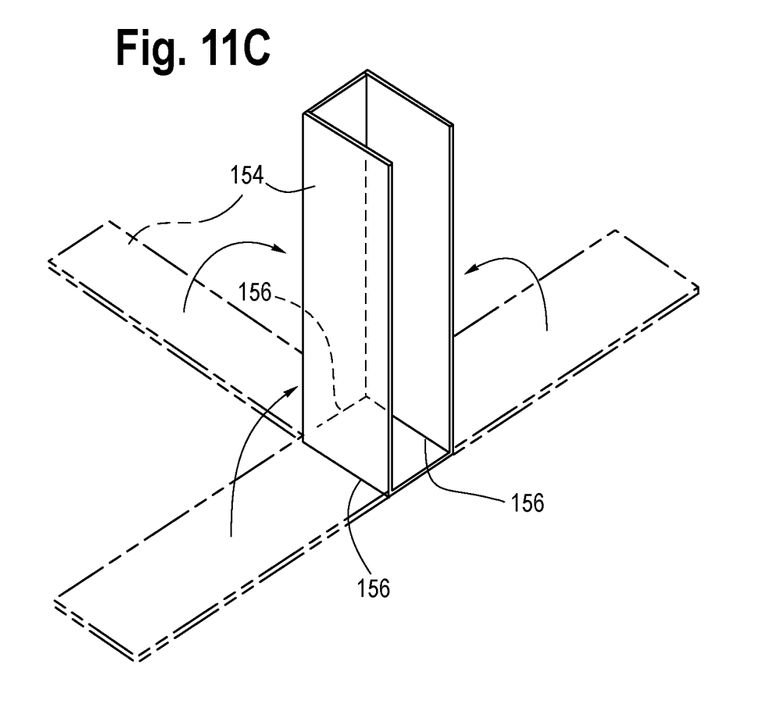
Figure 11D:
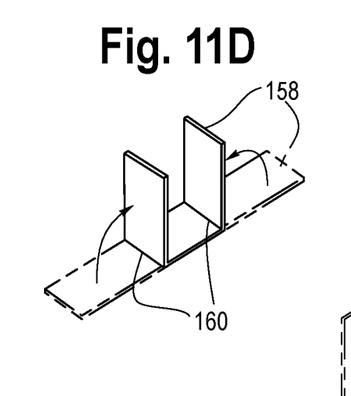
Figure 11E:
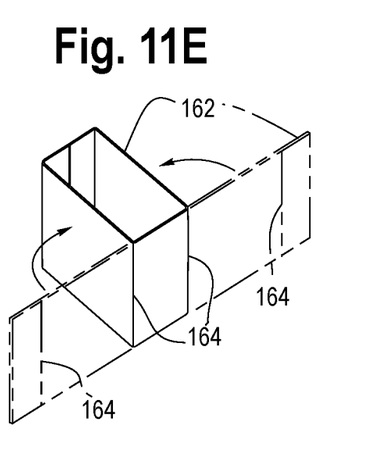
Figure 11F:
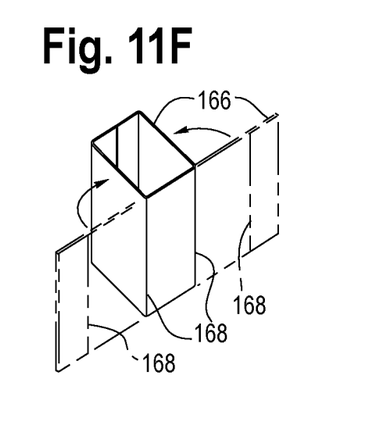
Figure 11G:
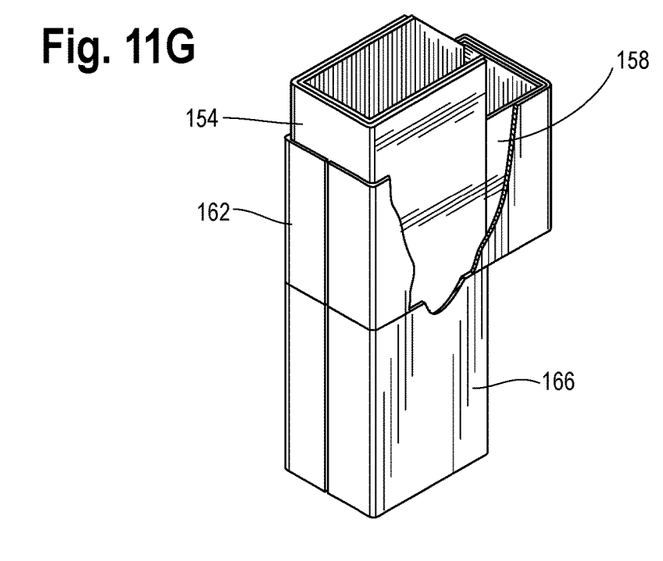

Next, one or more support wraps are added to the basic holster as shown in FIGS. 11C-11G. FIG. 11C shows a barrel side support wrap cut from, for example, three sheets of UHMWPE. It is folded along lines 156 and fused along barrel side 26 as shown in FIG. 11G. In a similar way, support wrap 158 is cut and folded along lines 160 to form a support for a trigger guard area and fused in place as shown in FIG. 11G.

Additional support for the holster is provided by horizontal support wraps 162 of FIGS. 11E and 166 of FIG. 11F. These wraps are cut, folded along lines 164 and 168 respectively, and fused in place as shown in FIG. 11G.

Figure 11H:
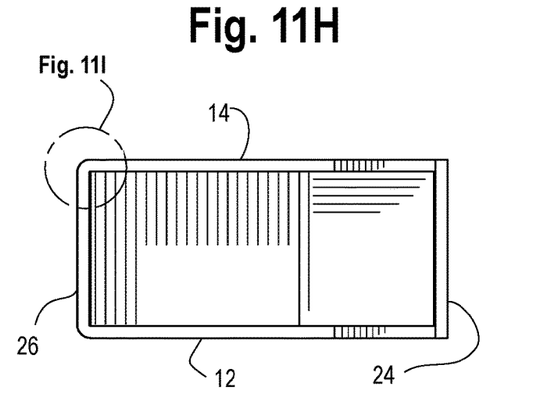
Figure 11I:
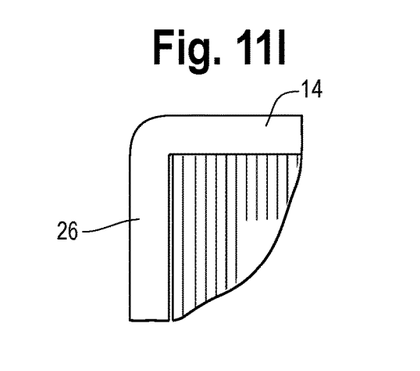
Figure 11J:
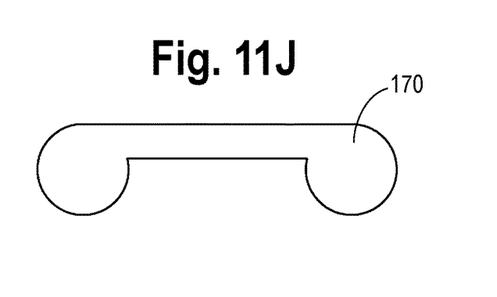

As an optional step, additional resistance to bullets discharges into the holster is provided as described in connection with FIGS. 11H-11J. FIG. 11H depicts a top view of the holster of FIG. 11A or 11G. FIG. 11I depicts detail view B of a corner of the holster, between muzzle end wall 16, barrel sidewall 26 and sidewall 14. It is possible that the manufacturing process of FIGS. 11A-11G may result in a very small hole in one or more corners of the holster adjacent to the muzzle end wall 16. In this situation, one or more patches 170, shown in FIG. 11J, may be added to the inside or outside of the holster. Although a specific shape is shown, one of ordinary skill in the art would understand that any number of sizes and shapes could be used.

Figure 3:
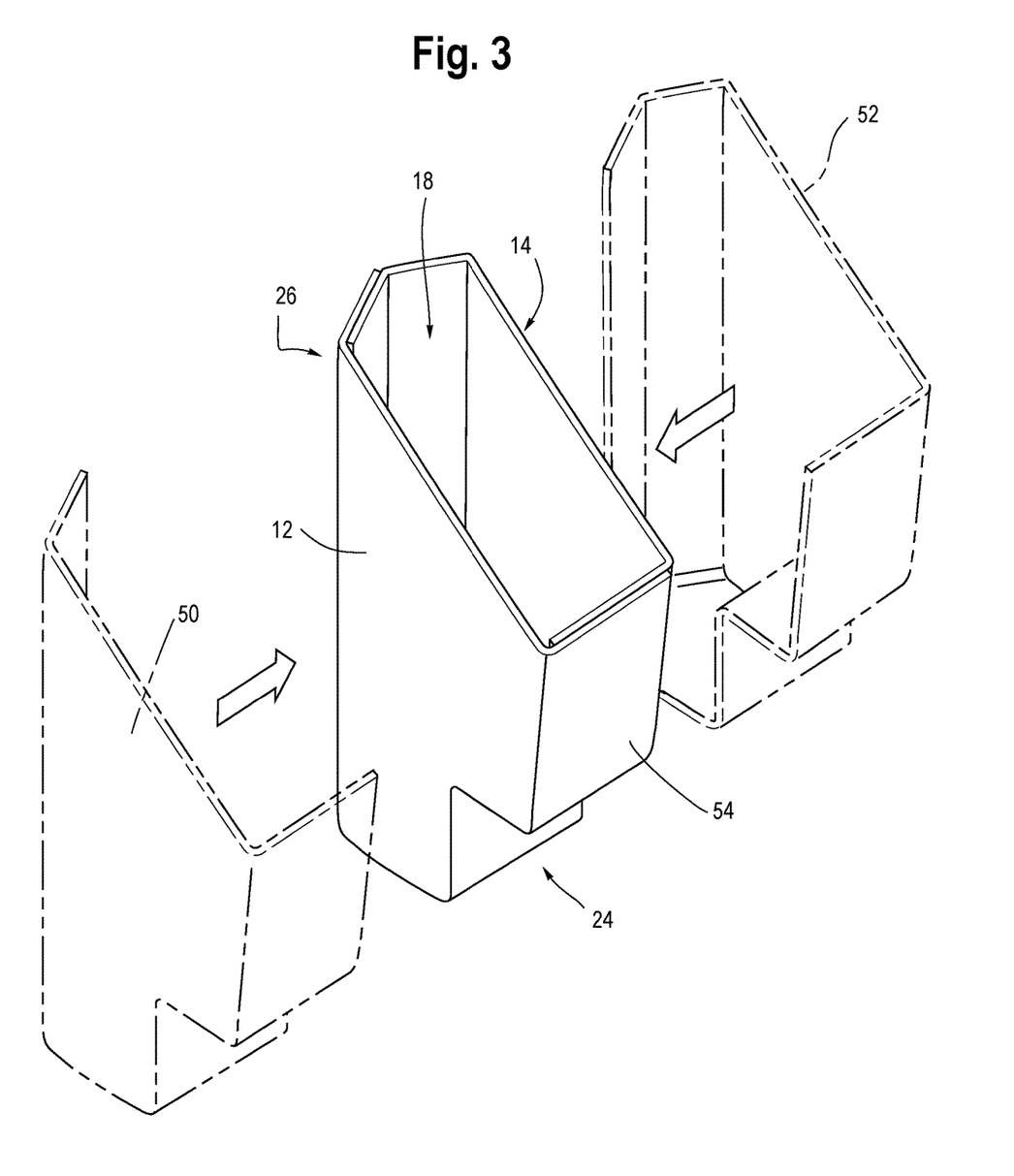
FIG. 3 is a view illustrating a manufacturing process of the holster of FIGS. 1 and 2.

A diagram illustrating another manufacturing process of the inventive holster is shown in FIG. 3. Two half shells 50 and 52 made from a plurality of sheets of ballistic or a combination of ballistic and non-ballistic material as described above. Half shell 50 includes, for example, body sidewall 12 and a portion of the adjacent walls 24, 26 and 16 of FIG. 1. Complementary half shell 52 includes, for example, away sidewall 14 and another portion of the adjacent ballistic walls 24, 26 and 16 of FIG. 1. Each of half shells 50 and 52 include a portion of trigger guard 54, as well.

A method a making a holster according to the present invention includes a first step of selecting a plurality of sheets of material to meet performance objectives as explained above. These sheets are pre-impregnated with resins, polymers or epoxies, for example. Next, the selected sheets are inserted into a heated platen press, for example, and formed into half shells 50 and 52 of FIG. 3. Finally, half shells are again inserted into a heated platen press, for example, and fused into a solid piece. As an alternative, the selected sheets of ballistic or a combination of ballistic and non-ballistic material are fused into a plate, then formed into half shells 50 and 52 as a separate step.

As depicted, complementary half shell 52 is designed to be slightly smaller than half shell 50 so that it can be nested into half shell 50. Although FIG. 3 shows complementary half shell 52 as nesting inside half shell 50, either of them may be smaller than the other. In addition, the portion of barrel sidewall 26 and trigger sidewall 24 in each of half shells 50 and 52 is designed to have enough width to allow it to be overlapped when half shells 50 and 52 are nested. After complementary half shell 52 is positioned at the appropriate location inside half shell 50 to form cavity 18, a subsequent step of the method is a second heat press operation to fuse the halves together into the solid ballistic material holster 10 of FIGS. 1 and 2. Although a general size and shape has been depicted in FIG. 3 so as to illustrate a manufacturing technique, one of ordinary skill in the art would understand that the appearance and contours, for example, of holster of FIG. 3 could be adjusted to suit a wide varieties of firearms and accessories. In addition, a holster manufactured according to FIG. 3 may also incorporate securing bands as shown in FIG. 11G. Screw, rivets or other reinforcing devices may also be used with holster 10.

An alternative method of manufacturing a holster according to the present invention includes the same first step of selection sheets of ballistic or a combination of ballistic and non-ballistic materials. These sheets are heat pressed into shapes corresponding to walls 12, 14,16 24 and 26. Each wall is then epoxied to form holster 10. Reinforcing bands are wrapped around holster 10 and fused into place as described in more detail below.

Figure 4A:
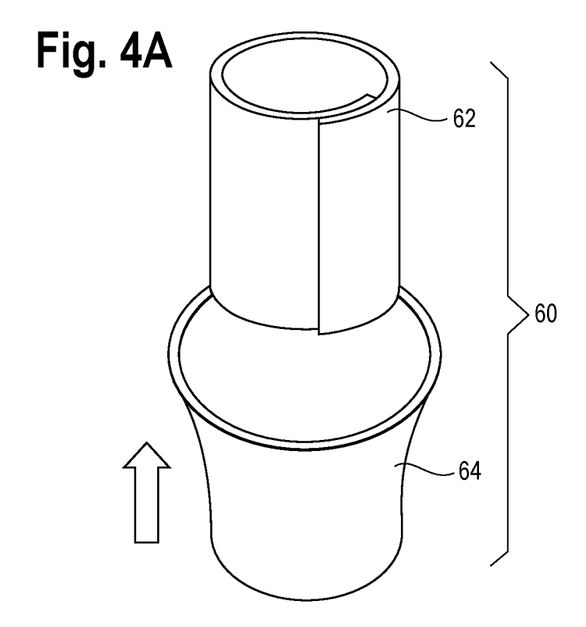
FIGS. 4A and 4B are a view illustrating an alternative manufacturing process of the holster of FIGS. 1 and 2.
Figure 4B:
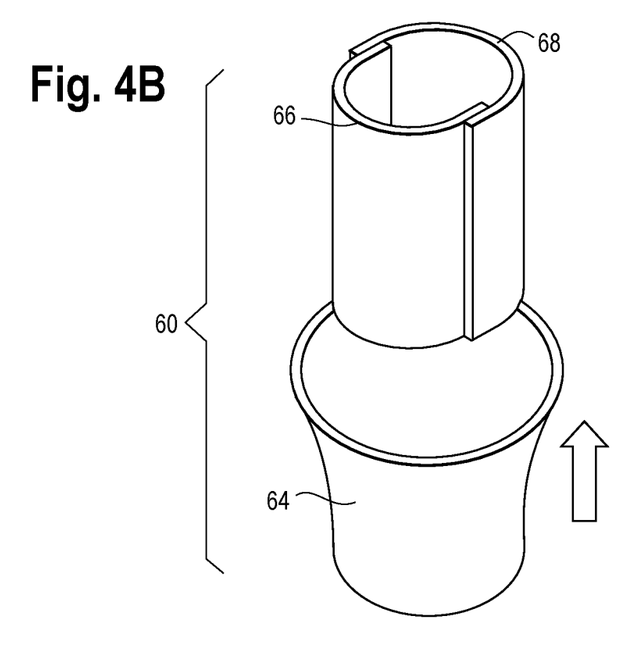

Alternative methods of manufacturing a holster according to the present invention are represented in FIGS. 4A and 4B. FIG. 4A depicts a grip side cylinder 60 in which a plurality of sheets of ballistic or a combination of ballistic and non-ballistic material are overlapped and heat pressed into a cylinder as described above for FIG. 3. At the same time, a generally cup-shaped muzzle end wall 64 is formed and fused using a heat press operation Finally, muzzle end wall 64 is heat pressed onto cylinder 60. In a variation, cylinder 60 can be formed from complementary halves 66 and 68 as shown in FIG. 4B before muzzle end wall 64 is heat pressed onto cylinder 60. This embodiment is similar to that of FIG. 3 and may also be used with or without securing bands as shown in FIG. 11G. Screw, rivets or other reinforcing devices may also be used with the holster. As above, FIG. 4 illustrates a manufacturing technique, one of ordinary skill in the art would understand that the appearance and contours, for example, of holster of FIG. 4 could be adjusted to suit a wide varieties of firearms and accessories.

Figures 5A, 5B:
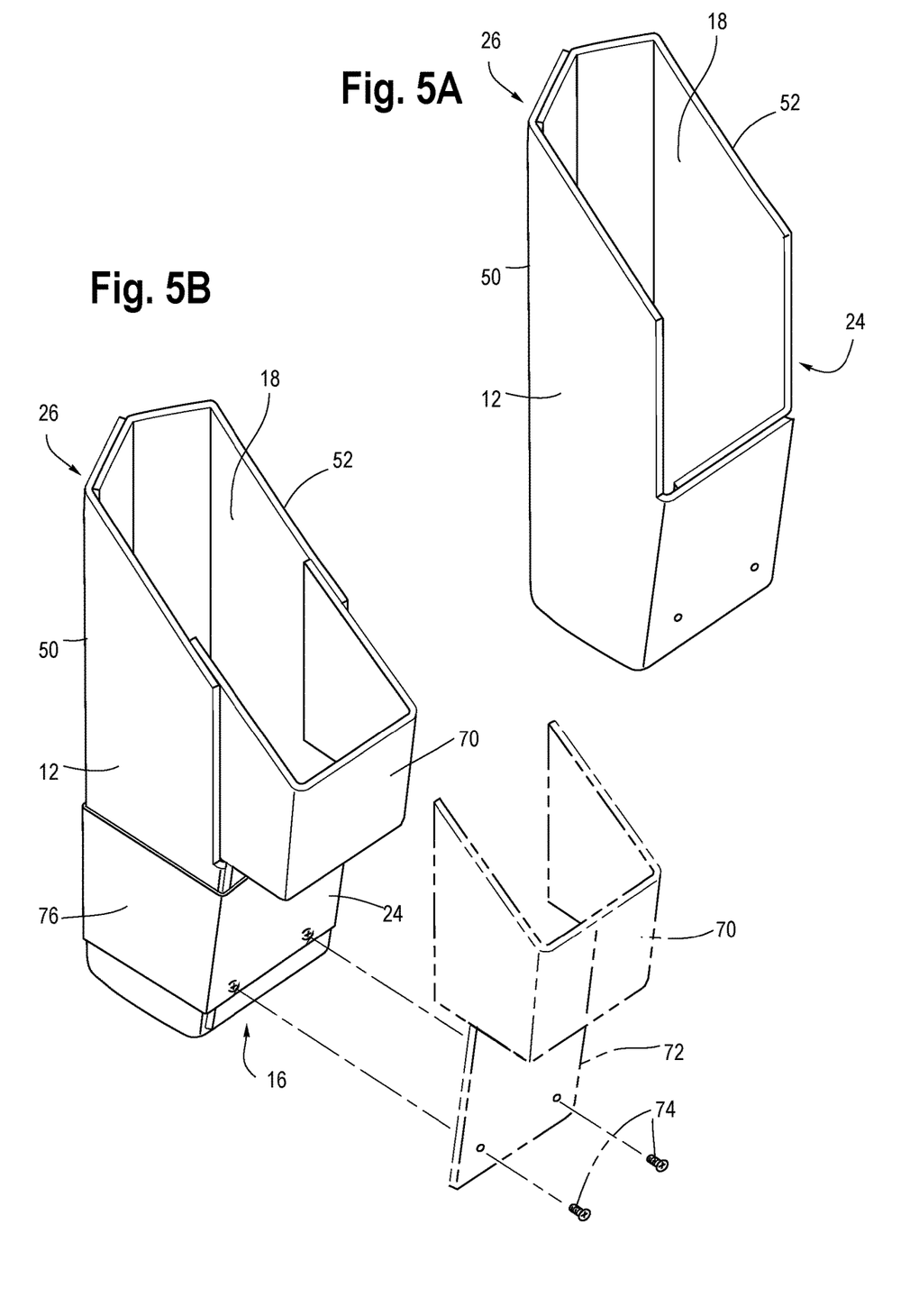
FIGS. 5A and 5B are exploded views of an alternative embodiment of the holster of FIG. 3.

Additional features of the invention are shown in FIGS. 5A and 5B. In this embodiment, trigger guard 54 of FIG. 3 is not integrally formed with trigger sidewall 24. Instead complementary half shells 50 and 52 have an open area in trigger sidewall 24 as shown. Trigger guard 70 is made from, for example, plastic, metal or another material and incorporates flange 72. Trigger guard 70 may also be made from ballistic and/or non-ballistic material as described above. Flange 72 extends down into cavity 18 along trigger sidewall 24 and is mounted using, for example, screws 74 as shown, or epoxy, or other attachment methods.

In a further embodiment, a band 76 of additional ballistic material may be fused in place around any of the disclosed holsters to provide additional strength. This option is depicted in FIG. 5B. Although a horizontal band encircling the holster is shown, a similar band could also be used to reinforce the holster vertically by extending along away sidewall 12, across muzzle end wall 16 then back up the other side. Bands similar to band 76 may also or alternatively be secured around trigger guard 54 or other locations around the holster.

Additionally, any of the disclosed holsters may be covered with protective materials including Kevlar, leather, carbon fiber, a mix of Kevlar and carbon fiber. They may also be spray coated with a plastic or epoxy spray, dipped in protective material or enclosed in a plastic material for example, a shell.

Figure 6:
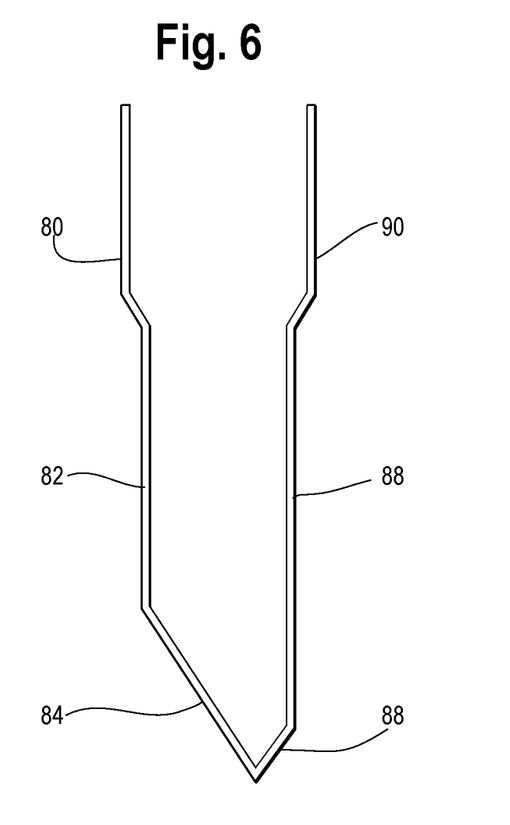
FIG. 6 depicts a cross-section of alternative embodiment of a holster according to the present invention.
Figure 7:
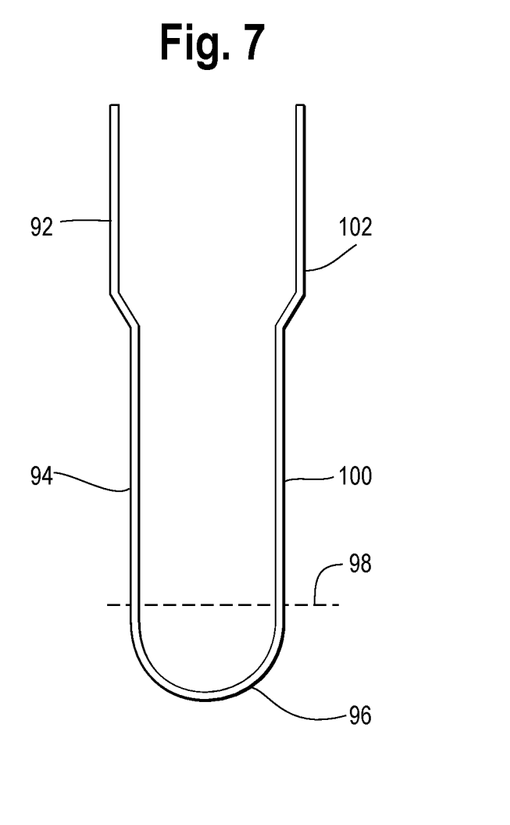
FIG. 7 depicts a cross-section of a further embodiment of a holster according to the present invention.

Further embodiments of the invention are depicted in FIGS. 6 and 7. FIG. 6 depicts a cross-section of a holster according to the present invention. In this embodiment, sides 88 and 82 are located closest to a user of a firearm. Sides 84 and 88 enclose the muzzle end of a firearm while sides 88 and 90 are facing away from a user. In this embodiment, sides 80, 82, 84 and 88 are made from a combination of materials including ballistic or a combination of ballistic and non-ballistic material as describe above. Sides 90 and 88, however, can either be made from the same combination of ballistic or a combination of ballistic and non-ballistic materials, or from solely non-ballistic materials such as plastic or metal. In this embodiment, a user is protected from a firearm discharge inside the holster by the bullet being captured or deflected by sides 84 and 88 away from the user.

FIG. 7 depicts a cross-section of a further alternative embodiment. In this embodiment, sides 92 and 94 are made from ballistic material or a combination of ballistic and non-ballistic material and are located adjacent to a user of a firearm. Sides 102 and 100 are similar to sides 90 and 88 of FIG. 6. Cup 96 is made from a separate piece of ballistic or a combination of ballistic and non-ballistic material and attached to sides 94 and 100 along line 98 by means of screws, rivets, epoxy, etc. In operation, if a firearm is discharged inside the holster, the bullet is captured in cup 96 which may or may not detach from the holster depending on the caliber of the bullet and the strength of the ballistic material. In the embodiment, the bullet is converted into a less lethal projectile.

Figure 8:
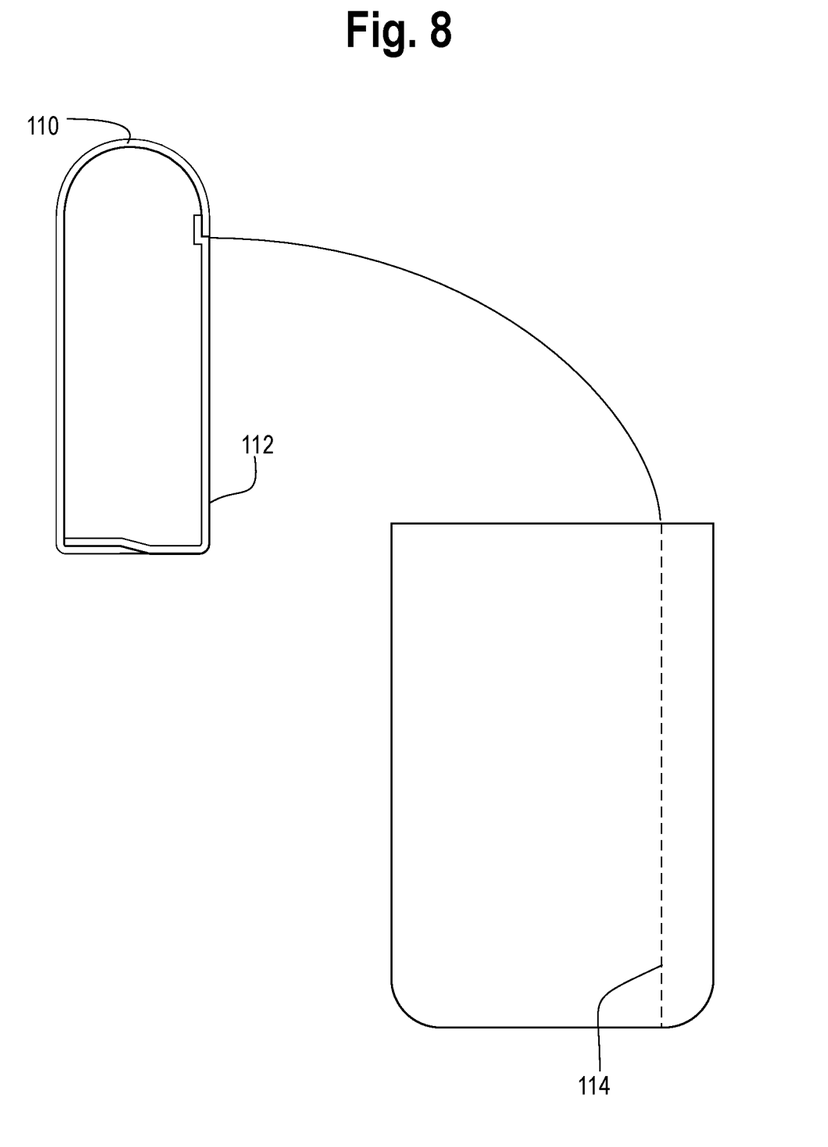
FIG. 8 is a cross-section top view of a further embodiment of a holster according to the present invention.

Top and side views of a further embodiment of the invention are shown in FIG. 8. In the top view, side 110 is made of a combination of ballistic or a combination of ballistic and non-ballistic materials as described above. Side 112 may also be made of the same or similar combination of materials, or of metal or plastic. Line 114 in the side view indicates an area of overlap of lines 110 and 112. Sides 110 and 112 may be attached with rivets, screws, epoxy, etc.

Figure 9:
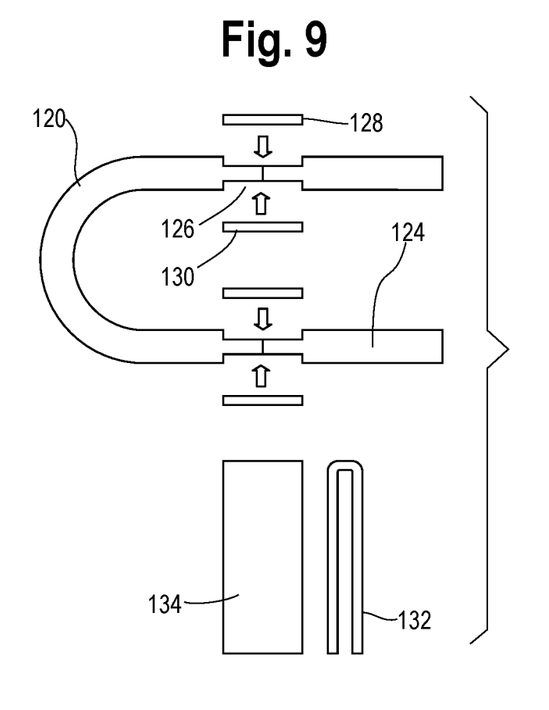
FIG. 9 is a cross-section of a further embodiment of a holster according to the present invention.

FIG. 9 depicts a cross-sectional top view of an alternative method of assembling the holster of FIG. 3. In this view, curved side 120 and straight sides 124 have a matching recessed flange area 126. The flanges are butted against each other, then additional strips of ballistic material 128 and 130 are fused in the recessed area 126 on either side of the flanges. A side view of strips 128 and 130 is shown at 134. In a further embodiment, material 128 and 130 is made from a single long strip 132 that is folded over into recessed area 126.

Figure 10:
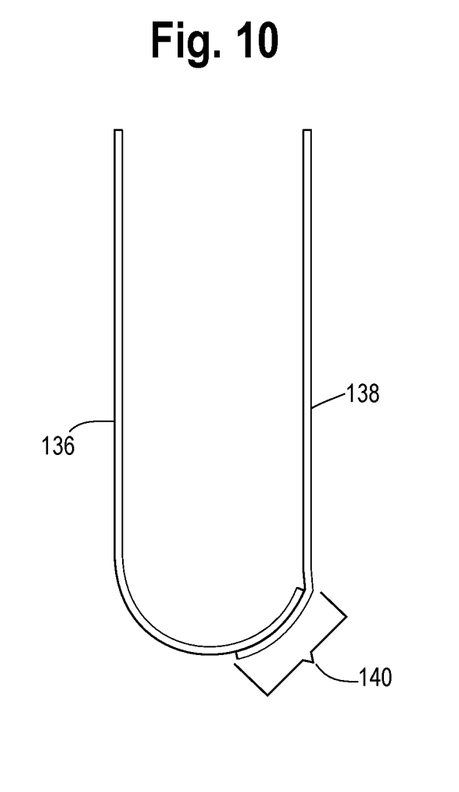
FIG. 10 depicts a cross-sectional side view of another embodiment of the invention.

FIG. 10 depicts a cross-sectional side view of another embodiment of the invention. Sides 136 and 138 are overlapped in area 140 as shown. In the area of overlap, sides 136 and 138 may be attached by, for example, fusing, screws, rivets or epoxy. All of the walls depicted in FIGS. 9-10 are made from ballistic material, a combination of ballistic and non-ballistic material, or non-ballistic material as explained above.

An advantage of any of the embodiments of FIGS. 6-10 is that, if a holster has been damaged by a firearm discharge, the damaged portion can be replaced without having to replace the entire holster.

If used and unless otherwise stated, the terms "upper," "lower," "front," "back," "over," "under," and similar such terms are not to be construed as limiting the invention to a particular orientation. Instead, these terms are used only on a relative basis.

Numerous alternative implementations of the present invention exist. For example, any of the above holsters may also include retention mechanisms such as straps, inserts, narrow areas for retaining a trigger guard, etc. In addition, a holster according to the present invention may use inserts made of plastic or another material to adapt the holster for different types of firearms. Other materials used for personal armor, such as graphene sheets, may also be used to manufacture a holster according to the present invention. Also, the holster described above could be made using additive manufacturing techniques.

The apparatus in one example comprises any (e.g., horizontal, oblique, or vertical) orientation, with the description and figures herein illustrating one example orientation of the apparatus, for explanatory purposes.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A firearm holster, comprising:
a first half shell having a first sidewall; and
a second half shell having a second sidewall;
wherein the first half shell is nested in the second half shell and the first and second sidewalls are directly fused with one another to form a cavity of a holster therebetween for enclosing one or both of a barrel and a trigger area of a firearm, the holster comprising an opening for receiving the firearm into the cavity and otherwise having no other gaps or openings.

2. The firearm holster of claim 1, wherein the first half shell comprises a first outside edge and first fold line and the second half shell comprises a second outside edge and a second fold line, and wherein the first sidewall extends between the first outside edge and the first fold line, the second side wall extends between the second outside edge and the second fold line, and the first sidewall substantially overlies the second sidewall and is disposed intermediate the cavity and the second sidewall.

3. The firearm holster of claim 2, wherein the first half shell comprises a third sidewall and the second half shell comprises a fourth sidewall, wherein the third sidewall substantially overlies the fourth sidewall and is disposed intermediate the cavity and the fourth sidewall.

4. The firearm holster of claim 1, further comprising a trigger guard that nests into the cavity, wherein the trigger guard includes a first sidewall and a second sidewall, the first half shell includes a third sidewall, the second half shell includes a fourth sidewall, the first sidewall is disposed adjacent to the third sidewall between the cavity and the third sidewall, and the second sidewall is disposed adjacent to the fourth sidewall between the cavity and the fourth sidewall.

5. The firearm holster of claim 4, wherein the trigger guard includes a flange portion that extends into the cavity and is fastened to one or both of the first half shell and the second half shell.

6. The firearm holster of claim 1, wherein at least one of first half shell and the second half shell is formed from a plurality of sheets of material.

7. The firearm holster of claim 6, wherein the plurality of sheets comprises a first sheet and a second sheet, wherein the first sheet and the second sheet are made of different materials.

8. The firearm holster of claim 7, wherein the first sheet comprises a ballistic material and the second sheet comprises a non-ballistic material.

9. The firearm holster of claim 6, wherein the plurality of sheets comprises a ultra-high-molecular-weight polyethylene (UHMPWE), a UHMWPE impregnated with a thermoset composition, an aramid material, a carbon fiber material, or a combination thereof.

10. The firearm holster of claim 1, further comprising mounting hardware for attaching the firearm holster to a carrying device.

11. The firearm holster of claim 1, further including a fastener to secure the mounting hardware to the firearm holster.

12. The firearm holster of claim 1, wherein the first half shell includes a first sidewall, a second sidewall, and a third sidewall and the second half shell includes a fourth sidewall, wherein the first through fourth sidewalls form interior walls of the cavity.

13. The firearm holster of claim 1, wherein the first half shell and the second half shell are fused to one another to form a solid piece.

14. The firearm holster of claim 1, further including a protective covering applied to a portion of at least one of the first half shell and the second half shell.

15. The firearm holster of claim 13, wherein the protective covering comprises one or more of a ballistic material, leather, carbon fiber, a plastic, epoxy, and a sprayable material or a combination thereof.

16. The firearm holster of claim 1, wherein at least one of the first half shell and the second half shell comprises an arcuate sidewall.

17. The firearm holster of claim 1, wherein the first half shell is nested in the second half shell to form a cylinder.

18. The firearm holster of claim 1, wherein a first portion of the first wall overlaps a second portion of the second wall, wherein the first portion is disposed between the cavity and the second portion.

19. The firearm holster of claim 1, further including a support wrap that surrounds the first half shell and second half shell and is fused thereto.

20. The firearm holder of claim 2, wherein the first half shell further includes fifth and sixth sidewalls disposed intermediate the first and third sidewalls.

* * * * *